(12) United States Patent
Heischkel et al.

(10) Patent No.: US 8,048,937 B2
(45) Date of Patent: Nov. 1, 2011

(54) RADIATION-CURABLE AQUEOUS POLYURETHANE DISPERSIONS

(75) Inventors: Yvonne Heischkel, Mannheim (DE); Harald Larbig, Rosenheim (DE); Werner Lebkuecher, Friedelsheim (DE); Reinhold Schwalm, Wachenheim (DE); Nick Gruber, Mannheim (DE); Christian Krueger, Saulheim (DE); Michael Kluge, Worms (DE); Cedric Dieleman, Scheibenhard (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 967 days.

(21) Appl. No.: 11/816,120

(22) PCT Filed: Feb. 23, 2006

(86) PCT No.: PCT/EP2006/060234
§ 371 (c)(1),
(2), (4) Date: Aug. 13, 2007

(87) PCT Pub. No.: WO2006/089935
PCT Pub. Date: Aug. 31, 2006

(65) Prior Publication Data
US 2008/0145563 A1 Jun. 19, 2008

(30) Foreign Application Priority Data

Feb. 24, 2005 (DE) .......................... 10 2005 008 930
Feb. 24, 2005 (DE) .......................... 10 2005 008 931
Feb. 24, 2005 (DE) .......................... 10 2005 008 932

(51) Int. Cl.
*C08F 290/14* (2006.01)
*C08F 2/46* (2006.01)
*C08G 18/67* (2006.01)

(52) U.S. Cl. ........................... 522/84; 522/90; 427/487

(58) Field of Classification Search .................. 427/487; 522/84, 90
See application file for complete search history.

(56) References Cited

U.S. PATENT DOCUMENTS

| | | | |
|---|---|---|---|
| 4,192,937 A | 3/1980 | Noll et al. | |
| 4,269,748 A | 5/1981 | Nachtkamp et al. | |
| 4,292,226 A | 9/1981 | Wenzel et al. | |
| 4,298,738 A | 11/1981 | Lechtken et al. | |
| 5,096,938 A | 3/1992 | Beck et al. | |
| 5,135,963 A | 8/1992 | Haeberle et al. | |
| 5,459,196 A | 10/1995 | Kressdorf et al. | |
| 5,516,860 A | 5/1996 | Reich et al. | |
| 5,534,559 A | 7/1996 | Leppard et al. | |
| 5,602,191 A | 2/1997 | Reich et al. | |
| 5,684,081 A | 11/1997 | Dannhorn et al. | |
| 6,444,721 B2 | 9/2002 | Schwalm et al. | |
| 6,562,464 B1 | 5/2003 | Schwalm et al. | |
| 6,617,413 B1 * | 9/2003 | Bruchmann et al. | 528/75 |
| 6,747,088 B1 | 6/2004 | Meisenburg et al. | |
| 7,105,206 B1 | 9/2006 | Beck et al. | |
| 7,169,841 B2 * | 1/2007 | Schwalm et al. | 524/507 |
| 2001/0029272 A1 * | 10/2001 | Schwalm et al. | 522/90 |
| 2003/0153673 A1 * | 8/2003 | Schwalm et al. | 524/589 |

FOREIGN PATENT DOCUMENTS

| | | |
|---|---|---|
| CA | 1129128 | 8/1982 |
| CA | 2059145 | 7/1992 |
| CA | 2159265 | 3/1996 |
| DE | 33 16 593 | 11/1984 |
| DE | 44 34 554 | 4/1996 |
| DE | 196 18 720 | 11/1996 |
| DE | 198 26 712 | 12/1999 |
| DE | 198 60 041 | 6/2000 |
| DE | 199 13 353 | 9/2000 |
| DE | 199 47 054 | 4/2001 |
| DE | 199 57 900 | 6/2001 |
| EP | 0 007 508 | 2/1980 |
| EP | 0 054 105 | 6/1982 |
| EP | 0 057 474 | 8/1982 |
| EP | 0 279 303 | 8/1988 |
| EP | 0 392 352 | 10/1990 |
| EP | 0 495 751 | 7/1992 |
| EP | 0 574 775 | 12/1993 |
| EP | 0 615 980 | 9/1994 |
| EP | 0 680 985 | 11/1995 |
| EP | 0 686 621 | 12/1995 |
| EP | 0 704 469 | 4/1996 |
| EP | 0 753 531 | 1/1997 |
| EP | 1 118 627 | 7/2001 |
| EP | 100 31 258 | 1/2002 |
| WO | 98/33761 | 8/1998 |
| WO | 00/39183 | 7/2000 |
| WO | 01/23453 | 4/2001 |
| WO | WO 02/00754 A1 | 1/2002 |
| WO | 2006-089935 | 8/2006 |

OTHER PUBLICATIONS

"Ullmanns Encyklopadie der Technischen Chemie" 4., Neubearbeitete und Erweiterte Auflage Band 19, Polyacryl-Verbindungen Bis Quecksilber. S. 62-65.

"Chemistry & Technology of UV & EB Formulation for Coatings, Inks & Paints", vol. II Prepolymers & Reactive Diluents, Edited by G. Webster.

H. -J. Cantow, et al.; "Advances in Polymer Science", Fortschritte der Hochpolymeren-Forschung, vol. 14, with 11 figures; Springer-Verlag Berlin. Heidelberg. New York 1974.

P.K.T. Oldring (Hrsg.), "Chemistry & Technology of UV& EB Formulation for Coatings, Inks & Paints", vol. 3, Photoinitiators for free radical and cationic polymerization.

* cited by examiner

*Primary Examiner* — Mark Eashoo
*Assistant Examiner* — Jessica Paul
(74) *Attorney, Agent, or Firm* — Oblon, Spivak, McClelland, Maier & Neustadt, L.L.P.

(57) ABSTRACT

The present invention relates to UV-curable polyurethane dispersions, to a process for preparing them, and to their use.

9 Claims, No Drawings

RADIATION-CURABLE AQUEOUS POLYURETHANE DISPERSIONS

The present invention relates to UV-curable polyurethane dispersions, to a process for preparing them, and to their use.

Radiation-curable polyurethane dispersions are known for example from DE-A-44 34 554 and are prepared from polyisocyanates, hydroxyl-containing polyesters, compounds having an isocyanate-reactive group and an acid group, and compounds having an isocyanate-reactive group and C=C double bonds. In terms of their processing properties, however, the products leave something to be desired.

WO 01/23453 describes UV-curable and thermally curable polyurethane dispersions based on aliphatic polyisocyanates, which may include polyisocyanates containing allophanate groups. These dispersions mandatorily comprise isocyanate groups capped with an isocyanate-blocking agent, and as diol component comprise diols having a molecular weight of less than 500 g/mol.

DE-A-1 98 60 041 describes reaction products of a) polyisocyanates and b) low molecular weight hydroxyl compounds having C=C double bonds such as hydroxyalkyl (meth)acrylates or hydroxyalkyl vinyl ethers, which for the most part constitute allophanates of the polyisocyanates with the unsaturated alcohols. The low molecular weight, low-viscosity reaction products feature a high polymerizable C=C double bond content in the molecule and can be cured not only with UV radiation but also with the involvement of the isocyanate groups, by exposure to steam, ammonia or amines, for example. Application in the form of aqueous dispersions is not described.

EP 392352 describes aqueous dispersions of polyurethanes which can be crosslinked by exposure to high-energy radiation. They are synthesized from polyisocyanates, polyol, polyamine, amino alcohol, polyetherol, and hydroxyalkyl acrylate. They are used to coat leather. The coatings produced from the polyurethane acrylates described are not very hard.

Polyisocyanates containing allophanate groups are set out as starting compounds merely in a broad list equivalent with other polyisocyanates.

Weathering-stable polyurethanes curable by means of high-energy radiation are claimed by EP 1118627. The coatings are produced by drying films of a polyurethane dispersion prepared from polyisocyanates, cycloaliphatic diols and/or diamines, and NCO-reactive compounds having at least one unsaturated group and a group which is active in dispersion. The coatings produced in this way are weathering-stable. A disadvantage has proven to be the relatively low scratch resistance.

Polyisocyanates containing allophanate groups are set out as starting compounds merely in a broad list equivalent with other polyisocyanates.

The reaction conditions explicitly disclosed in the examples of EP 1118627 do not give rise to the formation of any allophanate groups.

EP 574775 describes reactive, water-emulsifiable binders and their use to prepare paints. The binders are based on polyurethane dispersions consisting of an acrylate-functional prepolymer, e.g., a polyester acrylate, one or more polyisocyanates, and a water-emulsifiable polyester. The coatings described exhibit only a low pendulum hardness of less than 100 s, which under mechanical load would lead to damage to the coating.

Polyisocyanates containing allophanate groups are set out as starting compounds merely in a broad list equivalent with other polyisocyanates.

The reaction conditions disclosed in the examples of EP 574775 do not give rise to formation of any allophanate groups.

Radiation-curable aqueous dispersions are likewise described in EP 753531. They are prepared from a polyester acrylate having an OH number of 40 to 120 mg KOH/g, a polyesterol or polyetherol, an emulsifiable group, di- or polyisocyanates. Optionally a salt formation, dispersing operation, and chain extension with diamines can be carried out. The ethylenically unsaturated group is introduced exclusively via a hydroxyl-containing prepolymer. Hence the opportunities to raise the double bond density are limited.

Polyisocyanates containing allophanate groups are set out as starting compounds merely in a broad list equivalent with other polyisocyanates.

The reaction conditions disclosed in the examples of EP 753531 likewise do not give rise to formation of any allophanate groups.

DE 10031258 describes curable aqueous polyurethane dispersions consisting of a hydroxyethyl acrylate allophanate, hydroxyalkyl acrylate, a polyol, polyamine or polythiol, at least one acid group, a basic compound, and a thermal initiator. The polyurethanes described additionally and mandatorily comprise a thermal initiator. This reduces the thermal stability. The concentration described for the acid groups, which are necessary for dispersing in water, is not sufficient to give dispersions which are stable on storage over several months. Furthermore, the hardness of the coatings obtained with these dispersions is in need of improvement.

The present invention is based on the object of providing UV-curable aqueous polyurethane dispersions. These dispersions ought to give rise to coatings having good performance properties, especially having good chemical resistance and/or good mechanical properties, in particular a high level of hardness in conjunction with high coating elasticity, a high scratch resistance, and, moreover, good storage stability.

This object is achieved by radiation-curable aqueous polyurethane dispersions formed from a) at least one compound having at least two free isocyanate groups, at least one allophanate group, and at least one free-radically polymerizable C=C double bond attached via the allophanate group, which is attached directly to the double bond a carbonyl group or an oxygen atom in ether function, b) at least one compound having at least one group that is reactive toward isocyanate groups, and at least one free-radically polymerizable C=C double bond, c) if appropriate, at least one compound having at least two groups that are reactive toward isocyanate groups, selected from hydroxyl, mercapto, and primary and/or secondary amino groups, d) at least one compound having at least one group that is reactive toward isocyanate groups, and at least one acid group, e) at least one basic compound for complete or partial neutralization of the acid groups of compounds d), f) if appropriate, at least one compound different from b), d), and e), containing only one group that is reactive toward isocyanate groups, g) if appropriate, at least one polyisocyanate different from a), h) in the absence of a thermal initiator, i) if appropriate, further additives, selected from reactive diluents, photoinitiators, and customary coatings additives, k) water, and l) if appropriate, at least one diamine and/or polyamine.

In one preferred embodiment the polyurethanes prepared inventively, i.e., the reaction products of synthesis components a) to d) and also, if appropriate, f) and g), have a double bond density of at least 1.3 mol/kg, preferably at least 1.8, more preferably at least 2.0.

In the dispersions of the invention no isocyanate-functional compounds are used in which the isocyanate groups have been reacted in part or completely with what are called blocking agents. Blocking agents are compounds which convert isocyanate groups into blocked (capped or protected) isocyanate groups, which subsequently, below the temperature known as the deblocking temperature, do not display the customary reactions of a free isocyanate group. Such compounds with blocked isocyanate groups, which are not used inventively, are commonly employed in dual-cure coating compositions which are cured to completion via isocyanate group curing. The polyurethane dispersions of the invention, following their preparation, preferably no longer contain essentially any free isocyanate groups: that is, in general, less than 1% by weight NCO, preferably less than 0.75%, more preferably less than 0.66%, and very preferably less than 0.3% by weight NCO (calculated with a molar weight of 42 g/mol).

Component a)

Component a) comprises at least one compound having at least two free isocyanate groups, at least one allophanate group, and at least one free-radically polymerizable C=C double bond attached via the allophanate group, which is attached directly to the double bond a carbonyl group or an oxygen atom in ether function.

The component a) used inventively comprises allophanate groups; preferably the amount of allophanate groups (calculated as $C_2N_2HO_3$=101 g/mol) is 1% to 35%, preferably from 5% to 30%, more preferably from 10% to 35% by weight. The polyurethanes of the invention formed from the synthesis components a) to d) and also, if appropriate, f) and g) comprise 1% to 30%, preferably from 1% to 25%, more preferably from 2% to 20% by weight of allophanate groups. The component a) used inventively further comprises less than 5% by weight of uretdione.

The inventively comprised compounds of component a) are preferably substantially free from other groups which form from isocyanate groups, particularly isocyanurate, biuret, uretdione, iminooxadiazinetrione and/or carbodiimide groups. Preferably component a) is selected from compounds of the general formula I

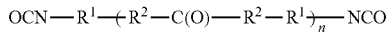

in which n is an integer from 1 to 10, $R^1$ is a divalent aliphatic or alicyclic $C_2$ to $C_{20}$, preferably $C_4$ to $C_{12}$, more preferably $C_6$ to $C_{10}$ hydrocarbon unit or an aromatic $C_6$ to $C_{20}$, preferably $C_6$ to $C_{12}$ hydrocarbon unit, $R^2$ in each repeating unit is —NH— or is

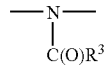

where $R^3$ is a radical derived from an alcohol A by abstracting the hydrogen atom from the alcoholic hydroxyl group, the alcohol A additionally containing at least one free-radically polymerizable C=C double bond and there being attached directly to the double bond a carbonyl group or an oxygen atom in ether linkage, preferably via a carbonyl group.

The radicals $R^1$ are preferably radicals derived by abstracting the isocyanate group from customary aliphatic, cycloaliphatic or aromatic polyisocyanates. The diisocyanates are preferably aliphatic isocyanates having 4 to 20 carbon atoms. Examples of customary diisocyanates are aliphatic diisocyanates such as tetramethylene 1,4-diisocyanate, hexamethylene 1,6-diisocyanate, 2-methyl 1,5-diisocyanatopentane, octamethylene 1,8-diisocyanate, decamethylene 1,10-diisocyanate, dodecamethylene 1,12-diisocyanate, tetradecamethylene diisocyanate, 2,2,4- and 2,4,4-trimethylhexane diisocyanate, derivatives of lysine diisocyanate, tetramethylxylylene diisocyanate, cycloaliphatic diisocyanates such as 1,4-, 1,3- or 1,2-diisocyanatocyclohexane, 4,4'- or 2,4'-di(isocyanatocyclohexyl)methane, isophorone diisocyanate, 1,3- or 1,4-bis-(isocyanatomethyl)cyclohexane, 2,4- and 2,6-diisocyanato-1-methylcyclohexane, and also aromatic diisocyanates such as tolylene 2,4- or 2,6-diisocyanate, m- or p-xylylene diisocyanate, 2,4'- or 4,4'-diisocyanatodiphenylmethane, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethyidiphenyl diisocyanate, 3-methyldiphenylmethane 4,4'-diisocyanate, and diphenyl ether 4,4'-diisocyanate. Mixtures of said diisocyanates may be present.

Preference is given to hexamethylene 1,6-diisocyanate, 1,3-bis(isocyanatomethyl)cyclohexane, isophorone diisocyanate, tetramethylxylylene diisocyanate, and di(isocyanatocyclohexyl)methane.

Mixtures of said diisocyanates may also be present. 2,2,4- and 2,4,4-trimethylhexane diisocyanate are present in the form, for example, of a mixture in a ratio of 1.5:1 to 1:1.5, preferably 1.2:1-1:1.2, more preferably 1.1:1-1:1.1, and very preferably 1:1.

Isophorone diisocyanate is present, for example, in the form of a mixture, specifically a mixture of the cis and trans isomers, generally in a ratio of about 60:40 to 80:20 (w/w), preferably in a ratio of about 70:30 to 75:25, and more preferably in a ratio of about 75:25.

Dicyclohexylmethane 4,4'-diisocyanate may likewise be present in the form of a mixture of the different cis and trans isomers.

Aromatic isocyanates are those comprising at least one aromatic ring system.

Cycloaliphatic isocyanates are those comprising at least one cycloaliphatic ring system.

Aliphatic isocyanates are those comprising exclusively linear or branched chains, i.e., acyclic compounds.

The alcohols A from which radical $R^3$ derives are, for example, esters of α,β-unsaturated carboxylic acids, such as acrylic acid, methacrylic acid ("(meth)acrylic acid" for short below), crotonic acid, acrylamidoglycolic acid, methacrylamidoglycolic acid or vinylacetic acid, preferably acrylic acid and methacrylic acid, and more preferably acrylic acid, and polyols having preferably 2 to 20 carbon atoms and at least 2 hydroxyl groups, such as ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctan-1,3-diol, hydroquinone, bisphenol A, bisphenol F, bisphenol B, bisphenol S, 2,2-bis(4-hydroxycyclohexyl)propane, 1,1-, 1,2-, 1,3- and 1,4-cyclohexanedimethanol, 1,2-, 1,3- or 1,4-cyclohexanediol, trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, with the proviso that the ester contains at least one isocyanate-reactive OH group. The radicals $R^3$ may also derive, additionally, from the amides of (meth)acrylic acid with amino alcohols, examples being 2-aminoethanol, 3-amino-1-propanol, 1-amino-2-propanol or 2-(2-aminoethoxy)ethanol, and from the vinyl ethers of the aforementioned polyols, provided they still contain a free OH group.

Also suitable as reactive components, furthermore, are unsaturated polyetherols, polyesterols or polyacrylatepolyols having an average OH functionality of 2 to 10.

Preferably the radicals $R^3$ derive from alcohols such as 2-hydroxyethyl (meth)acrylate, hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth)acrylate and pentaerythrityl di- and tri(meth)acrylate. With particular preference the alcohol A is selected from 2-hydroxyethyl acrylate, 2-hydroxyethyl methacrylate, and hydroxypropyl (meth)acrylate. Examples of amides of ethylenically unsaturated carboxylic acids with amino alcohols are hydroxyalkyl(meth)acrylamides such as N-hydroxymethyl(meth)acrylamide, N-hydroxyethyl(meth)acrylamide, 5-hydroxy-3-oxopentyl (meth)acrylamide, N-hydroxyalkylcrotonamides such as N-hydroxymethylcrotonamide, or N-hydroxyalkylmaleimides such as N-hydroxyethylmaleimide.

Component b)

Component b) comprises at least one compound having at least one group that is reactive toward isocyanate groups, and at least one free-radically polymerizable C=C double bond.

The compounds of component b) contain at least one free-radically polymerizable C=C double bond and also at least one further group that is reactive toward isocyanate groups.

Preferred compounds of components b) are, for example, the esters of dihydric or polyhydric alcohols with α,β-ethylenically unsaturated monocarboxylic and/or dicarboxylic acids and their anhydrides. Examples of α,β-ethylenically unsaturated monocarboxylic and/or dicarboxylic acids and their anhydrides that can be used include acrylic acid, methacrylic acid, fumaric acid, maleic acid, maleic anhydride, crotonic acid, itaconic acid, etc. It is preferred to use acrylic acid and methacrylic acid, more preferably acrylic acid.

Examples of suitable alcohols are diols such as ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3- or 1,4-cyclohexanediol, and tricyclodecanedimethanol.

Suitable triols and polyols have, for example, 3 to 25, preferably 3 to 18, carbon atoms. Examples include trimethylolbutane, trimethylolpropane, trimethylolethane, pentaerythritol, glycerol, ditrimethylolpropane, dipentaerythritol, ditrimethylolpropane, sorbitol, mannitol, diglycerol, threitol, erythritol, adonitol (ribitol), arabitol (lyxitol), xylitol, dulcitol (galactitol), maltitol or isomalt.

Preferably the compounds of component b) are selected from 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, trimethylolpropane mono- or diacrylate, pentaerythrityl di- or triacrylate, and mixtures thereof.

If desired these compounds can also additionally be chain-extended by reaction with a suitable chain extender, such as a polyfunctional isocyanate or a polyfunctional carboxylic acid, for example.

The compounds b) preferably are a compound other than the above-described alcohol A.

Preferably compounds b) are esters of the abovementioned α,β-unsaturated acids, preferably (meth)acrylates, more preferably acrylates of compounds of the formula (Ia) to (Ic),

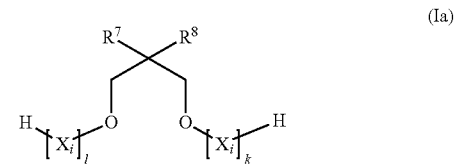

(Ia)

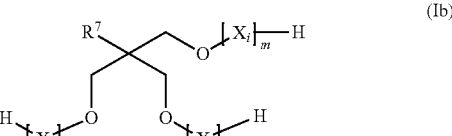

(Ib)

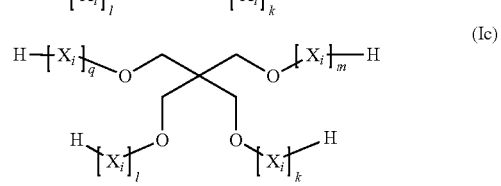

(Ic)

in which $R^7$ and $R^8$ independently of one another are hydrogen or optionally aryl-, alkyl-, aryloxy-, alkyloxy-, heteroatom- and/or heterocycle-substituted $C_1$-$C_{18}$ alkyl, k, l, m and q independently of one another are each an integer from 1 to 15, preferably 1 to 10, and more preferably 1 to 7, and each $X_i$ for i=1 to k, 1 to l, 1 to m, and 1 to q, can be selected independently of the others from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—, in which Ph stands for phenyl and Vin stands for vinyl.

Optionally aryl-, alkyl-, aryloxy-, alkyloxy-, heteroatom- and/or heterocycle-substituted $C_1$-$C_{18}$ alkyl is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

Preferably the compounds in question are (meth)acrylates of singly to trigintuply and more preferably triply to vigintuply ethoxylated, propoxylated or mixedly ethoxylated and propoxylated, and in particular exclusively ethoxylated, neopentyl glycol, trimethylolpropane, trimethylolethane or pentaerythritol.

Suitable compounds b) are, furthermore, the esters and amides of amino alcohols with the aforementioned α,β-ethylenically unsaturated monocarboxylic and/or dicarboxylic acids, hydroxyalkyl vinyl ethers such as hydroxybutyl vinyl ether etc.

Further suitable compounds b) are at least mono-hydroxyfunctional epoxy (meth)acrylates, urethane (meth)acrylates, polyether (meth)acrylates, polyester (meth)acrylates or polycarbonate (meth)acrylates.

Urethane (meth)acrylates are obtainable for example by reacting polyisocyanates with hydroxyalkyl (meth)acrylates or hydroxyalkyl vinyl ethers and, if appropriate, chain extenders such as diols, polyols, diamines, polyamines, dithiols or polythiols.

Urethane (meth)acrylates of this kind comprise as synthesis components substantially:
(1) at least one organic aliphatic, aromatic or cycloaliphatic di- or polyisocyanate, such as those listed above under a),
(2) at least one compound having at least one isocyanate-reactive group and at least one free-radically polymerizable unsaturated group, such as the alcohols A listed above or those listed earlier on above under b), and
(3) if appropriate, at least one compound having at least two isocyanate-reactive groups, such as those listed below under c).

Components (1), (2), and (3) may be the same as those described above for the polyurethanes of the invention.

The urethane (meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane (meth)acrylates preferably have a (meth) acrylic group content of 1 to 5, more preferably of 2 to 4, mol per 1000 g of urethane (meth)acrylate.

Particularly preferred urethane (meth)acrylates have an average OH functionality of 1.5 to 4.5.

Epoxy (meth)acrylates are preferably obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene) (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Preference is given to bisphenol A diglycidyl ether, bisphenol F diglycidyl ether, bisphenol B diglycidyl ether, and bisphenol S diglycidyl ether, and bisphenol A diglycidyl ether is particularly preferred.

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene) (CAS No. [16096-30-3]) and of hydrogenated bisphenol A (2,2-bis[4-(2,3-epoxypropoxy)cyclohexyl]propane, CAS No. [13410-58-7]).

Preference is given to 1,4-butanediol diglycidyl ether, 1,6-hexanediol diglycidyl ether, trimethylolpropane triglycidyl ether, pentaerythritol tetraglycidyl ether, and 2,2-bis[4-(2,3-epoxypropoxy)cyclohexyl]propane.

The abovementioned aromatic glycidyl ethers are particularly preferred.

The epoxy (meth)acrylates and epoxy vinyl ethers preferably have a number-average molar weight $M_n$ of 200 to 20 000, more preferably of 200 to 10 000 g/mol, and very preferably of 250 to 3000 g/mol; the amount of (meth)acrylic or vinyl ether groups is preferably 1 to 5, more preferably 2 to 4, per 1000 g of epoxy (meth)acrylate or vinyl ether epoxide (determined by gel permeation chromatography using polystyrene as standard and tetrahydrofuran as eluent).

Preferred epoxy (meth)acrylates have an OH number of 40 to 400 mg KOH/g.

Preferred epoxy (meth)acrylates have an average OH functionality of 1.5 to 4.5.

Particularly preferred epoxy (meth)acrylates are those such as are obtained from processes in accordance with EP-A-54 105, DE-A 33 16 593, EP-A 680 985, and EP-A-279 303, in which in a first stage a (meth)acrylic ester is prepared from (meth)acrylic acid and hydroxy compounds and in a second stage excess (meth)acrylic acid is reacted with epoxides.

Suitable hydroxy compounds include compounds having one or more hydroxyl groups. Mention may be made of monoalcohols, e.g., $C_1$-$C_{20}$ alkanols or alkoxylated alcohols having a remaining OH group, $C_2$-$C_8$ alkylenediols, trimethylolpropane, glycerol or pentaerythritol, or compounds comprising hydroxyl groups and alkoxylated, for example, with ethylene oxide and/or propylene oxide, examples being the compounds specified above under a) or b) or the compounds specified below under c).

Preferred hydroxy compounds are saturated polyesterols which comprise at least 2, in particular 2 to 6, free hydroxyl groups and which if appropriate may also comprise ether groups, or polyetherols having at least 2, in particular 2 to 6, free hydroxyl groups.

The molecular weights $M_n$ of the polyesterols and/or polyetherols are preferably between 100 and 4000 ($M_n$ determined by gel permeation chromatography using polystyrene as standard and tetrahydrofuran as eluent).

Hydroxyl-containing polyesterols of this kind can be prepared, for example, in customary fashion by esterifying dicarboxylic or polycarboxylic acids with diols or polyols. The starting materials for hydroxyl-containing polyesters of this kind are known to the skilled worker.

As dicarboxylic acids it is possible with preference to use succinic acid, glutaric acid, adipic acid, sebacic acid, o-phthalic acid, their isomers and hydrogenation products, and also esterifiable derivatives, such as anhydrides, maleic anhydride for example, or dialkyl esters of said acids. As polycarboxylic acid and/or anhydrides thereof, mention may be made of tribasic or tetrabasic acids such as trimellitic anhydride or benzenetetracarboxylic acid.

Preferred diols suitably include ethylene glycol, propylene-1,2-glycol and -1,3-glycol, butane-1,4-diol, hexane-1,6-diol, neopentyl glycol, cyclohexanedimethanol, and also polyglycols of the ethylene glycol type having a molar mass of 106 to 2000, polyglycols of the propylene glycol type having a molar mass of 134 to 2000, or polyTHF having a molar mass of 162 to 2000.

Polyols include primarily trimethylolbutane, trimethylolpropane, trimethylolethane, neopentyl glycol, neopentyl glycol hydroxypivalate, pentaerythritol, 2-ethyl-1,3-propanediol, 2-methyl-1,3-propanediol, 2-ethyl-1,3-hexanediol, glycerol, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol, or sugar alcohols such as, for example, sorbitol, mannitol, diglycerol, threitol, erythritol, adonitol (ribitol), arabitol (lyxitol), xylitol, dulcitol (galactitol), maltitol or isomalt.

Also suitable as diols or polyols are oxalkylated (with ethylene oxide and/or propylene oxide, for example) diols or polyols, particularly those having a degree of oxalkylation of 0 to 20, preferably 0-15, more preferably 0-10, and very preferably 1-5, based on the respective hydroxyl groups of the diol or polyol.

Preferred among these are in each case the products alkoxylated exclusively with ethylene oxide.

The polyesterols which can be used also include polycaprolactonediols and -triols, whose preparation is likewise known to the skilled worker.

Suitable hydroxyl-containing polyetherols include, for example, those which may be obtained by known processes, by reacting dihydric and/or polyhydric alcohols with different amounts of ethylene oxide and/or propylene oxide. It is also possible, similarly, to use polymerization products of tetrahydrofuran or of butylene oxide or of isobutylene oxide.

Preferred hydroxyl-containing polyethers are oxalkylation products of the abovementioned diols or polyols, especially those having a degree of oxalkylation of 0 to 20, more preferably 1 to 15, very preferably 1-7 and in particular 1-5, based on the respective hydroxyl groups of the diol or polyol, but where in total there are at least 2 alkoxy groups in the polyether.

In the case of the esterification of (meth)acrylic acid in the instance of the hydroxyl-containing polyester it is, for example, also possible to introduce the (meth)acrylic acid as an initial charge together with starting materials of the hydroxyl-containing polyester, examples being dicarboxylic acids or their anhydrides and diols and/or polyols, and to react the starting materials together with the (meth)acrylic acid in one stage.

For the esterification of (meth)acrylic acid with the hydroxy compound the processes known to the skilled worker are suitable.

In the esterification of (meth)acrylic acid with the hydroxy compound it is preferred to use 0.1 to 1.5, more preferably 0.5 to 1.4, and very preferably 0.7 to 1.3 equivalents of (meth)acrylic acid per hydroxy equivalent of the hydroxy compounds. In the abovementioned case of starting the esterification from the starting materials, e.g., of the hydroxyl-comprising polyester, the equivalents of the (meth)acrylic acid are based on the hydroxy equivalent remaining theoretically after reaction of the starting materials, e.g., reaction of dicarboxylic acids with diols or polyols.

The reaction of (meth)acrylic acid with the hydroxy compounds can be carried out for example in the presence of an acidic esterification catalyst, such as sulfuric acid, p-toluenesulfonic acid, dodecylbenzenesulfonic acid or acidic ion exchangers, and also in the presence of a hydrocarbon that forms an azeotropic mixture with water, and can be carried out in particular up to a conversion of, for example, at least 80%, preferably at least 85%, more preferably 90% to 98%, and in particular 90-95%, of the hydroxyl groups of the hydroxy compound, at 60 to 140° C., for example. The water of reaction formed is removed azeotropically. Suitable hydrocarbons are aliphatics and aromatics, e.g., alkanes and cycloalkanes, such as pentane, n-hexane, n-heptane, methylcyclohexane, and cyclohexane, aromatics such as benzene, toluene, and the xylene isomers, and products known as special-boiling-point spirits, which have boiling limits between 70 and 140° C.

In order to prevent premature polymerization the reaction with (meth)acrylic acid is advantageously conducted in the presence of small amounts of inhibitors. These are the customary compounds used to prevent thermal polymerization, of the type, for example, of hydroquinone, of hydroquinone monoalkyl ethers, especially hydroquinone monomethyl ether, of 2,6-di-tert-butylphenol, of N-nitrosoamines, of phenothiazines, of phosphorous esters or of hypophosphorous acid. They are used generally in amounts of 0.001 to 2.0%, preferably in amounts of 0.005 to 0.5%, based on the reaction in the first stage.

Following the esterification the solvent, the hydrocarbon for example, can be removed from the reaction mixture by distillation, under reduced pressure if appropriate. The esterification catalyst can be neutralized in a suitable way, such as by adding tertiary amines or alkali metal hydroxides. Excess (meth)acrylic acid, too, can be removed in part by distillation, for example, under reduced pressure.

Prior to the beginning of the reaction in the second stage, the reaction product of the first stage generally still has an acid number (AN) of more than 20, preferably of 30 to 300, more preferably of 35 to 250 mg KOH/g solids (without solvent).

In the second stage, the reaction product obtained in the first stage is reacted with one or more epoxide compounds, preferably one epoxide compound. Epoxide compounds are those having at least one, preferably having at least two, more preferably two or three, epoxide groups in the molecule.

Suitable examples include epoxidized olefins, glycidyl esters (e.g., glycidyl (meth)acrylate) of saturated or unsaturated carboxylic acids, or glycidyl ethers of aliphatic or aromatic polyols. Products of this kind are available commercially in large number. Particularly preferred are polyglycidyl compounds of the bisphenol A, F or B type and glycidyl ethers of polyfunctional alcohols, e.g., of butanediol, of 1,6-hexanediol, of glycerol, and of pentaerythritol. Examples of polyepoxide compounds of this kind are Epikote® 812 (epoxide value: about 0.67 mol/100 g) and Epikote® 828 (epoxide value: about 0.53 mol/100 g), Epikote® 1001, Epikote® 1007 and Epikote® 162 (epoxide value: about 0.61 mol/100 g) from Resolution, Rütapox® 0162 (epoxide value: about 0.58 mol/100 g), Rütapox® 0164 (epoxide value: about 0.53 mol/100 g), and Rütapox® 0165 (epoxide value: about 0.48 mol/100 g) from Bakelite A G, and Araldit® DY 0397 (epoxide value: about 0.83 mol/100 g) from Huntsman.

The epoxide compounds are added to the reaction product obtained in the first stage generally in amounts of more than 10%, preferably 15% to 95%, and more preferably 15% to 70%, by weight, based on the reaction mixture of the first stage (without solvent). With very particular preference the epoxide compounds are used in approximately equimolar amounts, based on the acid equivalents still present in the reaction product of the first stage.

In the course of reaction with epoxide compounds in the second stage, unreacted acid or acid used in excess, especially (meth)acrylic acid, but also, for example, hydroxy compounds or dicarboxylic acid still present as starting material in the mixture, or resultant monoesters of dicarboxylic acids, having a remaining acid group, is bonded as epoxide ester.

The reaction with epoxide compounds can be accelerated by adding catalysts. Examples of suitable catalysts include tertiary alkylamines, tertiary alkylamino alcohols, tetraalkylammonium salts, as described in EP 686621 A1, p. 4, ll. 9-41.

Carbonate (meth)acrylates comprise on average preferably 1 to 5, especially 2 to 4, more preferably 2 to 3 (meth)acrylic groups, and very preferably 2 (meth)acrylic groups.

The number-average molecular weight Mn of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

In an analogous way it is also possible to obtain vinyl ether carbonates, by reacting a hydroxyalkyl vinyl ether with carbonic esters and also, if appropriate, with dihydric alcohols.

Also conceivable are (meth)acrylates or vinyl ethers of polycarbonate polyols, such as the reaction product of one of the aforementioned diols or polyols and a carbonic ester and also a hydroxyl-containing (meth)acrylate or vinyl ether.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth)acrylate, and pentaerythrityl mono-, -di-, and tri(meth)acrylate.

Suitable hydroxyl-containing vinyl ethers are, for example, 2-hydroxyethyl vinyl ether and 4-hydroxybutyl vinyl ether.

Particularly preferred carbonate (meth)acrylates are those of the formula:

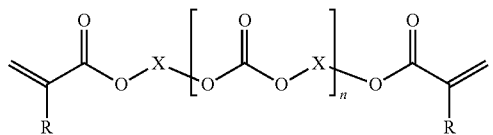

in which R is H or CH$_3$, X is a C$_2$-C$_{18}$ alkylene group, and n is an integer from 1 to 5, preferably 1 to 3.

R is preferably H and X is preferably C$_2$ to C$_{10}$ alkylene, examples being 1,2-ethylene, 1,2-propylene, 1,3-propylene, 1,4-butylene, and 1,6-hexylene, more preferably C$_4$ to C$_8$ alkylene. With very particular preference X is C$_6$ alkylene.

The carbonate (meth)acrylates are preferably aliphatic carbonate (meth)acrylates.

They further include customary polycarbonates known to the skilled worker and having terminal hydroxyl groups, which are obtainable, for example, by reacting the aforementioned diols with phosgene or carbonic diesters.

Polyether (meth)acrylates are, for example, mono(meth)acrylates of polyTHF having a molar weight between 162 and 2000, poly-1,3-propanediol having a molar weight between 134 and 2000, or polyethylene glycol having a molar weight between 238 and 2000.

Component c)

Optional component c) is at least one compound having at least two groups that are reactive toward isocyanate groups, selected from hydroxyl, mercapto, and primary and/or secondary amino groups.

Suitable compounds c) are not only low molecular weight alcohols c1) but also polymeric polyols c2), preferably compounds c2).

Low molecular weight alcohols c1) have a molecular weight of not more than 500 g/mol. Particularly preferred are alcohols having 2 to 20 carbon atoms and 2 to 6 hydroxyl groups, such as the aforementioned glycols. Preference is given in particular to hydrolysis-stable, short-chain diols having 4 to 20, preferably 6 to 12, carbon atoms. Such compounds include, preferably, 1,1-, 1,2-, 1,3- or 1,4-di(hydroxymethyl)cyclohexane, bis(hydroxycyclohexyl)propane, tetramethylcyclobutanediol, cyclooctanediol or norbornanediol. Aliphatic hydrocarbon diols are particularly preferred for use, such as the isomeric butanediols, pentanediols, hexanediols, heptanediols, octanediols, nonanediols, decanediols, undecanediols, and dodecanediols. Particular preference is given to 1,2-, 1,3- or 1,4-butanediol, 1,4-pentanediol, 1,5-pentanediol, 1,6-hexanediol, 2,5-hexanediol, dihydroxymethylcyclohexane, bishydroxycyclohexylpropane, etc.

Suitable compounds c2) are, furthermore, polymeric polyols. The number-average molecular weight M$_n$ of these polymers is preferably situated within a range from about 500 to 100 000, more preferably 500 to 10 000. The OH numbers are situated preferably in a range from about 20 to 300 mg KOH/g polymer.

Examples of preferred polymers c2) are copolymers which comprise in copolymerized form at least one of the aforementioned monoesters of dihydric or polyhydric alcohols with at least one α,β-ethylenically unsaturated monocarboxylic and/or dicarboxylic acid and at least one further comonomer, preferably selected from vinylaromatics, such as styrene, esters of the aforementioned α,β-unsaturated monocarboxylic and/or dicarboxylic acids with monoalcohols, vinyl esters of carboxylic acids comprising up to 20 carbon atoms, vinyl halides, nonaromatic hydrocarbons having 4 to 8 carbon atoms and 1 or 2 double bonds, unsaturated nitriles, etc., and mixtures thereof. They further include (partially) hydrolyzed vinyl ester polymers, preferably polyvinyl acetates.

They further include polyesterols based on aliphatic, cycloaliphatic and/or aromatic dicarboxylic, tricarboxylic and/or polycarboxylic acids with diols, triols and/or polyols, and also lactone-based polyesterols.

Polyesterpolyols are known for example from Ullmanns Encyklopädie der technischen Chemie, 4th edition, volume 19, pp. 62 to 65. Preference is given to using polyesterpolyols obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyesterpolyols. The polycarboxylic acids may be aliphatic, cycloaliphatic, araliphatic, aromatic or heterocyclic and may if appropriate be substituted, by halogen atoms for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH, y being a number from 1 to 20, preferably an even number from 2 to 20; more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass between 162 and 2000, poly-1,3-propanediol having a molar mass between 134 and 2000, poly-1,2-propanediol having a molar mass between 134 and 2000, polyethylene glycol having a molar mass between 106 and 2000, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if appropriate may have been alkoxylated as described above.

Preferred alcohols are those of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Preference is further given to neopentyl glycol.

Also suitable, furthermore, are polycarbonate-diols, such as may be obtained, for example, by reacting phosgene with an excess of the low molecular weight alcohols specified as synthesis components for the polyesterpolyols.

Also suitable are lactone-based polyesterdiols, which are homopolymers or copolymers of lactones, preferably hydroxy-terminated adducts of lactones with suitable difunctional starter molecules. Suitable lactones include, preferably, those deriving from compounds of the general formula HO—$(CH_2)_z$—COOH, z being a number from 1 to 20 and it being possible for an H atom of a methylene unit to have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight dihydric alcohols specified above as a synthesis component for the polyesterpolyols. The corresponding polymers of ε-caprolactone are particularly preferred. Lower polyesterdiols or polyetherdiols as well can be used as starters for preparing the lactone polymers. In lieu of the polymers of lactones it is also possible to use the corresponding, chemically equivalent polycondensates of the hydroxy carboxylic acids corresponding to the lactones.

Further included here are polyetherols, which are obtainable by polymerizing cyclic ethers or by reacting alkylene oxides with a starter molecule, and also α,ω-diamino polyethers obtainable by reacting polyetherols with ammonia.

Examples hereof are the products generally known as Jeffamines® from Huntsman.

The Jeffamines® specified here are mono-, di- or triamines which are based on polyethers, polyethylene oxides, polypropylene oxides or mixed polyethylene oxides/polypropylene oxides and which may have a molar mass of up to about 5000 g/mol.

Examples of monoamines of this kind are the so-called Jeffamine® M series, which constitute methyl-capped polyalkylene oxides having an amino function, such as M-600 (XTJ-505), having a propylene oxide (PO)/ethylene oxide (EO) ratio of about 9:1 and a molar mass of about 600, M-1000 (XTJ-506): PO/EO ratio 3:19, molar mass about 1000, M-2005 (XTJ-507): PO/EO ratio 29:6, molar mass about 2000 or M-2070: PO/EO ratio 10:31, molar mass about 2000.

Examples of diamines of such kind are those known as Jeffamine® D or ED series. The D series are amino-functionalized polypropylenediols comprising 3-4 1,2-propylene units (Jeffamine® D-230, average molar mass 230), 6-7 1,2-propylene units (Jeffamine® D-400, average molar mass 400), on average about 34 1,2-propylene units (Jeffamine® D-2000, average molar mass 2000) or on average about 69 1,2-propylene units (Jeffamine® XTJ-510 (D-4000), average molar mass 4000). These products may also be partly in the form of amino alcohols. The ED series are diamines based on polyethylene oxides, which idealizedly are propoxylated at both ends; for example, Jeffamine® HK-511 (XTJ-511) comprising 2 ethylene oxide and 2 propylene oxide units, with an average molar mass of 220, Jeffamine® XTJ-500 (ED-600) comprising 9 ethylene oxide and 3.6 propylene oxide units, with an average molar mass of 600, and Jeffamine® XTJ-502 (ED-2003) comprising 38.7 ethylene oxide and 6 propylene oxide units, with an average molar mass of 2000.

Examples of triamines are Jeffamine® T-403, a triamine based on a trimethylolpropane modified with 5-6 1,2-propylene units, Jeffamine® T-5000, a triamine based on a glycerol modified with about 85 1,2-propylene units, and Jeffamine® XTJ-509 (T-3000), a triamine based on a glycerol modified with 50 1,2-propylene units.

The aforementioned components c) can be used individually or as mixtures.

Component d)

Component d) is at least one compound having at least one group that is reactive toward isocyanate groups, and at least one acid group.

The acid groups of the compounds of component d) are preferably selected from carboxylic acid groups, sulfonic acid groups, phosphonic acid groups, and phosphoric acid groups. Preference is given to carboxylic acid and sulfonic acid groups, particular preference to carboxylic acids.

Suitable compounds d) having at least one isocyanate-reactive group and also at least one carboxylic acid or sulfonic acid group include, in particular, aliphatic monomercapto, monohydroxy, and monoamino and imino carboxylic acids and corresponding sulfonic acids, such as mercaptoacetic acid (thioglycolic acid), mercaptopropionic acid, mercaptosuccinic acid, hydroxyacetic acid, hydroxypropionic acid (lactic acid), hydroxysuccinic acid, hydroxypivalic acid, dimethylolpropionic acid, dimethyloibutyric acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminoethanesulfonic acid, aminopropanesulfonic acid, glycine (aminoacetic acid), N-cyclohexylaminoethanesulfonic acid, N-cyclohexylaminopropanesulfonic acid, or iminodiacetic acid.

Preference is given to dimethylolpropionic acid and dimethylolbutyric acid, particular preference to dimethylolpropionic acid.

Component e)

Component e) is at least one basic compound for complete or partial neutralization of the acid groups of compounds d).

Suitable basic compounds e) for complete or partial neutralization of the acid groups of compounds d) include organic and inorganic bases such as alkali metal and alkaline earth metal hydroxides, oxides, carbonates, and hydrogencarbonates, and also ammonia or primary, secondary or tertiary amines. Preference is given to complete or partial neutralization with amines such as with ethanolamine or diethanolamine and in particular with tertiary amines, such as triethylamine, triethanolamine, dimethylethanolamine or diethylethanolamine. The amounts of chemically bonded acid groups introduced, and the extent of neutralization of the acid groups (which is usually 40% to 100% of the equivalent basis), ought preferably to be enough to ensure that the polyurethanes are dispersed in an aqueous medium, this being familiar to the skilled worker.

Component f)

In the dispersions of the invention as component f) it is possible to use at least one further compound having a group which is reactive toward isocyanate groups. This group can be a hydroxyl or mercapto group or a primary or secondary amino group. Suitable compounds f) are the customary compounds known to the skilled worker, which are used conventionally in polyurethane preparation as stoppers for lowering the number of reactive free isocyanate groups or for modifying the polyurethane properties. Examples include monofunctional alcohols, such as methanol, ethanol, n-propanol, isopropanol, n-butanol etc. Suitable components f) are also amines having one primary or secondary amino group, such as methylamine, ethylamine, n-propylamine, diisopropylamine, dimethylamine, diethylamine, di-n-propylamine, diisopropylamine etc.

Component g)

In the dispersions of the invention it is possible as components g) to use at least one polyisocyanate which is different from the compounds of components a). As components g) in accordance with the invention no use is made of polyisocyanates where the isocyanate groups have been reacted with a blocking agent.

Preferred compounds g) are polyisocyanates having an NCO functionality of 2 to 4.5, more preferably 2 to 3.5. As component g) it is preferred to use aliphatic, cycloaliphatic and araliphatic diisocyanates. These may be, for example, the diisocyanates set out above under a), but are different from the compound a). Preferred compounds g) have 2 or more isocyanate groups and also a group selected from the group of urethane, urea, biuret, allophanate, carbodiimide, urethonimine, urethdione, and isocyanurate groups.

Preferred use is made as component g) of isophorone diisocyanate, 1,3- and 1,4-bis(isocyanatomethyl)cyclohexane, their isocyanurates, biurets, and mixtures thereof.

Where the dispersions of the invention comprise not only component a) but also a component g), the fraction of the compounds of component g) is preferably 0.1% to 90%, more preferably 1% to 50%, in particular 5% to 30%, by weight based on the total amount of the compounds of components a) and g).

Component h)

Thermal initiators h) for the purposes of the present invention are those which have a half-life at 60° C. of at least one hour. The half-life of a thermal initiator is the time taken for half the initial amount of the initiator to decompose into free radicals.

Thermal initiators are mandatorily absent in accordance with the invention, and are therefore present in amounts of less than 0.1% by weight.

Component i)

The dispersion of the invention may comprise at least one further compound such as is normally employed as a reactive diluent. These include, for example, the reactive diluents as described in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Preferred reactive diluents are compounds different from component b) which have at least one free-radically polymerizable C=C double bond.

Examples of reactive diluents include esters of (meth) acrylic acid with alcohols which have 1 to 20 carbon atoms, e.g., methyl (meth)acrylate, ethyl (meth)acrylate, butyl (meth)acrylate, 2-ethylhexyl (meth)acrylate, 2-hydroxyethyl acrylate, 4-hydroxybutyl acrylate, dihydrodicyclopentadienyl acrylate, vinylaromatic compounds, e.g., styrene, divinylbenzene, α,β-unsaturated nitriles, e.g., acrylonitrile, methacrylonitrile, α,β-unsaturated aldehydes, e.g., acrolein, methacrolein, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, isobutene, cyclic monounsaturated compounds, e.g., cyclopentene, cyclohexene, cyclododecene, N-vinylformamide, allylacetic acid, vinylacetic acid, monoethylenically unsaturated carboxylic acids having 3 to 8 carbon atoms and also their water-soluble alkali metal, alkaline earth metal or ammonium salts, such as, for example: acrylic acid, methacrylic acid, dimethylacrylic acid, ethacrylic acid, maleic acid, citraconic acid, methylenemalonic acid, crotonic acid, fumaric acid, mesaconic acid, and itaconic acid, maleic acid, N-vinylpyrrolidone, N-vinyl lactams, such as N-vinylcaprolactam, N-vinyl-N-alkylcarboxamides or N-vinyl-carboxamides, such as N-vinylacetamide, N-vinyl-N-methylformamide, and N-vinyl-N-methylacetamide or vinyl ethers, e.g., methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, 4-hydroxybutyl vinyl ether, and mixtures thereof.

Compounds having at least two free-radically polymerizable C=C double bonds: these include, in particular, the diesters and polyesters of the aforementioned α,β-ethylenically unsaturated monocarboxylic and/or dicarboxylic acids with diols or polyols. Particularly preferred are hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythritol diacrylate, dipentaerythritol tetraacrylate, dipentaerythritol triacrylate, pentaerythritol tetraacrylate, etc. Also preferred are the esters of alkoxylated polyols, with α,β-ethylenically unsaturated monocarboxylic and/or dicarboxylic acids, such as the polyacrylates or polymethacrylates of alkoxylated trimethylolpropane, glycerol or pentaerythritol. Additionally suitable are the esters of alicyclic diols, such as cyclohexanediol di(meth)acrylate and bis(hydroxymethylethyl)cyclohexane di(meth)acrylate. Further suitable reactive diluents are trimethylolpropane monoformal acrylate, glycerol formal acrylate, 4-tetrahydropyranyl acrylate, 2-tetrahydropyranyl methacrylate, and tetrahydrofurfuryl acrylate.

Where the dispersions of the invention are cured not with electron beams but instead by means of UV radiation, the preparations of the invention preferably comprise at least one photoinitiator which is able to initiate the polymerization of ethylenically unsaturated double bonds.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF AG), ethyl 2,4,6-trimethylbenzoylphenylphosphinate (Lucirin® TPO L from BASF AG), bis(2,4,6-trimethylbenzoyl)phenylphosphine oxide (Irgacure® 819 from Ciba Spezialitätenchemie), benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, and 2,3-butanedione.

Also suitable are nonyellowing or low-yellowing photoinitiators of the phenylglyoxalic ester type, as described in DE-A 198 26 712, DE-A 199 13 353 or WO 98/33761.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone, and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The dispersions of the invention comprise the photoinitiators preferably in an amount of 0.05% to 10%, more preferably 0.1% to 8%, in particular 0.2% to 5%, by weight based on the total amount of components a) to i).

The dispersions of the invention may comprise further customary coatings additives, such as flow control agents, defoamers, UV absorbers, dyes, pigments and/or fillers.

Suitable fillers comprise silicates, e.g., silicates obtainable by hydrolysis of silicon tetrachloride, such as Aerosil R from Degussa, siliceous earth, talc, aluminum silicates, magnesium silicates, and calcium carbonates, etc. Suitable stabilizers comprise typical UV absorbers such as oxanilides, triazines, and benzotriazole (the latter obtainable as Tinuvin R grades from Ciba-Spezialitatenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used usually in amounts of 0.1% to 5.0% by weight, based on the "solid" components comprised in the preparation.

Component l)

Polyamines having 2 or more primary and/or secondary amino groups can be used in particular when the chain extension and/or crosslinking is to take place in the presence of water, since amines generally react quicker with isocyanates than do alcohols or water. This is often necessary when aqueous dispersions of crosslinked polyurethanes or polyurethanes of high molar weight are desired. In such cases the procedure is to prepare prepolymers containing isocyanate groups, to disperse them rapidly in water, and then, by adding compounds having two or more isocyanate-reactive amino groups, to subject them to chain extension or crosslinking.

Amines suitable for this purpose are generally polyfunctional amines of the molar weight range from 32 to 500 g/mol, preferably from 60 to 300 g/mol, which comprise at least two primary, two secondary or one primary and one secondary amino group(s). Examples of such are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane, or higher amines such as triethylenetetramine, tetraethylenepentamine or polymeric amines such as polyethyleneamines, hydrogenated polyacrylonitriles, or at least partially hydrolyzed poly-N-vinylformamides, in each case with a molar weight of up to 2000, preferably up to 1000 g/mol.

The amines can also be employed in blocked form, e.g., in the form of the corresponding ketimines (see, e.g., CA-1 129 128), ketazines (cf., e.g., U.S. Pat. No. 4,269,748) or amine salts (see U.S. Pat. No. 4,292,226). Oxazolidines as well, as are used, for example, in U.S. Pat. No. 4,192,937, represent capped polyamines, which can be used for preparing the polyurethanes for chain-extending the prepolymers. When using capped polyamines of this kind they are generally blended with the prepolymers in the absence of water and this mixture is subsequently mixed with the dispersion water or with a portion of the dispersion water, so that the corresponding polyamines are liberated by hydrolysis.

It is preferred to use mixtures of diamines and triamines, more preferably mixtures of isophoronediamine and diethylenetriamine.

The fraction of polyamines can be up to 10 mol %, preferably up to 8 mol %, and more preferably up to 5 mol %, based on the total amount of C=C double bonds.

The solids content of the aqueous dispersions of the invention is preferably situated within a range from about 5% to 70%, in particular 20% to 50% by weight.

Preferred dispersions are those where, of the isocyanate groups of the compounds of component a) and, if present, g),
  5 to 80 mol %, preferably 10 to 80 mol %, more preferably 15-75 mol % have undergone reaction with groups of at least one compound of component b) that are reactive toward isocyanate groups,
  0 to 70 mol %, preferably 0.2 to 60 mol %, more preferably 0.5-30 mol %, have undergone reaction with groups of at least one compound of component c) that are reactive toward isocyanate groups,
  0.1 to 40 mol %, preferably 2 to 35 mol %, more preferably 5 to 30 mol % have undergone reaction with toward isocyanate groups of at least one compound of component d).

The figures relate to molar equivalents of a functional group.

The dispersions of the invention are particularly suitable for coating substrates such as wood, paper, textile, leather, nonwoven, plastics surfaces, glass, ceramic, mineral building materials, such as cement moldings and fiber-cement slabs, and, in particular, for coating metals or coated metals.

After curing by means of high-energy radiation, the dispersions of the invention advantageously form films having good performance properties, such as good scratchability, chemical resistance, weathering stability and/or good mechanical properties.

The substrates are coated in accordance with customary methods that are known to the skilled worker, involving the application of at least one dispersion of the invention to the substrate that is to be coated, in the desired thickness, and removal of the volatile constituents of the dispersions. This process can be repeated one or more times if desired. Application to the substrate may take place in a known way, e.g., by spraying, troweling, knifecoating, brushing, rolling, rollercoating or pouring. The coating thickness is generally situated within a range from about 3 to 1000 g/m$^2$ and preferably 10 to 200 g/m$^2$.

If appropriate, if two or more films of the coating material are applied one on top of another, a radiation cure may take place after each coating operation.

Radiation curing is accomplished by exposure to high-energy radiation, i.e., UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flash light), halogen lamps or excimer emitters. The radiation dose normally sufficient for crosslinking in the case of UV curing is situated within the range from 80 to 3000 mJ/cm$^2$.

Irradiation may also if appropriate be carried out in the absence of oxygen, e.g., under an inert gas atmosphere. Suitable inert gases include, preferably, nitrogen, noble gases, carbon dioxide or combustion gases. Irradiation may also take place with the coating material being covered by transparent media. Transparent media are, for example, polymeric films, glass or liquids, e.g., water. Particular preference is given to irradiation in the manner as is described in DE-A1 199 57 900.

In one preferred process, curing takes place continuously, by passing the substrate treated with the preparation of the invention at constant speed past a radiation source. For this it is necessary for the cure rate of the preparation of the invention to be sufficiently high.

This varied course of curing over time can be exploited in particular when the coating of the article is followed by a further processing step in which the film surface comes into direct contact with another article or is worked on mechanically.

The advantage of the dispersions of the invention is that the coated articles can be processed further immediately following the radiation cure, since the surface is no longer sticky. On the other hand, the dried film is still sufficiently flexible and stretchable that the article can still be deformed without the film flaking or tearing.

The invention further provides for the use of a dispersion, as described above, for coating substrates of metal, wood, paper, ceramic, glass, plastic, textile, leather, nonwoven, or mineral building materials.

The polyurethane dispersions of the invention can be used in particular as primers, surfacers, pigmented topcoat materials, and clearcoat materials in the sectors of industrial coating, especially aircraft coating or large-vehicle coating, wood coating, automotive finishing, especially OEM finishing or automotive refinish, or decorative coating. The coating materials are especially suitable for applications where particularly high application reliability, exterior weathering stability, optical qualities, solvent resistance and/or chemical resistance are required.

The invention is illustrated by means of the following, nonlimiting examples.

EXAMPLES

Unless indicated otherwise, parts and percentages indicated are by weight.

Component A: Allophanate formed from hexamethylene diisocyanate and hydroxyethyl acrylate, described in WO 00/39183, p. 24, Table 1, 14.9% NCO content, 2 mol/kg acrylate groups content.

Polyesterol C: Polyester formed from adipic acid and 1,4-butanediol, molar mass 1000 g/mol Preparation of Polyester Acrylate D:

In an apparatus fitted with water separator 258.1 g of ethoxylated trimethylpropane (OH number about 610 mg KOH/g), 206.1 g of phthalic anhydride, 125.3 g of 1,4-butanediol, 210.5 g of acrylic acid and 16 g of p-toluenesulfonic acid (65% strength in water), 310 g of methylcyclohexane were heated in the presence of 0.8 g of 2,6-di(t-butyl)-4-methylphenol, 0.8 g of triphenyl phosphite, 0.8 g of hypophosphorous acid (50% in water), 2.83 g of 4-methoxyphenol and 0.055 g of phenothiazine. After a reaction time of 10 hours, about 83 g of water were removed from the reaction. The solvent was subsequently distilled off under reduced pressure (20 mbar) at 102° C. and 18 g of aqueous tetra(n-butyl)ammonium bromide solution (75%) were added. The acid number after the distillation was about 55 mg KOH/g. The excess acrylic acid was reacted with 115.6 g of bisphenol A diglycidyl ether (epoxide content about 5.4 mol/kg) at a temperature of 105-110° C. for 6 hours. The acid number of the resultant acrylate was 4 mg KOH/g. The viscosity of the resin was 18 Pas in accordance with DIN 53019. Acrylate groups content: 3.0 mol/kg Example 1

Preparation of a Polyurethane and a Polyurethane Dispersion

A 4 l reaction vessel equipped with a stirrer, dropping funnel, thermometer and reflux condenser was charged with 149.4 g of polycaprolactonediol (Capa® 212 from Solvay, molar mass=1000 g/mol, OH number=113 mg KOH/g), 21.7 g of 1,2-ethanediol, 69.66 g of hydroxyethyl acrylate, 26.8 g of dimethylolpropionic acid, 0.08 g of 2,6-di-t-butyl-4-methylphenol and 0.04 g of hydroquinone monomethyl ether and this initial charge was stirred at a bath temperature of 75° C. Over the course of 60 minutes, in parallel, 149.86 g of isophorone diisocyanate, 59.1 g of tris(hexamethylene-diisocyanato)isocyanurate and 82.5 g of component A were added dropwise. When the feed was at an end, 115.4 g of acetone were metered in. Subsequently, after 90 minutes and after 4 hours, portions of 0.125 g of dibutyltin dilaurate were added dropwise. At an NCO content of 0.50% the batch was diluted with 186.2 g of acetone and neutralized with 76 g of 10% strength aqueous sodium hydroxide solution. Over the course of 20 minutes, 782.1 g of water were introduced dropwise into the polymer solution with stirring. Thereafter the acetone was distilled off under reduced pressure and the batch was diluted with 157.5 g of water.

Solids content: 36%, pH: 8.10, viscosity: 91.7 mPas, average particle diameter: 152 nm.

Example 2

Preparation of a Polyurethane and a Polyurethane Dispersion

In a 4 l reaction vessel equipped with a stirrer, dropping funnel, thermometer and reflux condenser, 74.7 g of polycaprolactone (Capa 212 from Solvay, molar mass=1000 g/mol, OH number=113 mg KOH/g), 26.35 g of 1,2-ethanediol, 69.66 g of hydroxyethyl acrylate, 26.8 g of dimethylolpropionic acid, 0.088 g of 2,6-di-t-butyl-4-methylphenol and 0.047 g of hydroquinone monomethyl ether were stirred at a bath temperature of 75° C. Over the course of 60 minutes, 261.25 g of component A and 131 g of bis(4,4'-isocyanatocyclohexyl)methane were added dropwise. When the feed was at an end, 130 g of acetone were metered in. Subsequently, after 90 minutes and after 4 hours, portions of 0.145 g of dibutyltin dilaurate were added dropwise. At an NCO content of 0.60% the batch was diluted with 187.6 g of acetone and neutralized with 76 g of 10% strength aqueous sodium hydroxide solution. Over the course of 20 minutes, 693.96 g of water were introduced dropwise into the polymer solution with stirring. Thereafter the acetone was distilled off under reduced pressure and the batch was diluted with 136.13 g of water.

Solids content: 36%, pH: 8.03, viscosity: 38.4 mPas, average particle diameter: 83 nm.

Example 3

Preparation of a Polyurethane and a Polyurethane Dispersion

In a 4 l reaction vessel equipped with a stirrer, dropping funnel, thermometer and reflux condenser, 74.7 g of polycaprolactone (Capa 212 from Solvay, molar mass=1000 g/mol, OH number=113 mg KOH/g), 26.35 g of 1,2-ethanediol, 69.66 g of hydroxyethyl acrylate, 26.8 g of dimethylolpropionic acid, 0.08 g of 2,6-di-t-butyl-4-methylphenol and 0.04 g of hydroquinone monomethyl ether were stirred at a bath temperature of 75° C. Over the course of 60 minutes, 261.25 g of component A were added dropwise. When the feed was at an end, 130 g of acetone were metered in. Subsequently, after 90 minutes and after 4 hours, portions of 0.14 g of dibutyltin dilaurate were added dropwise. At an NCO content of 0.50% the batch was diluted with 187 g of acetone and neutralized with 76 g of 10% strength aqueous sodium hydroxide solution. Over the course of 20 minutes, 666.93 g of water were introduced dropwise into the polymer solution with stirring. Thereafter the acetone was distilled off under reduced pressure and the batch was diluted with 131.3 g of water.

Solids content: 34%, pH: 8.06, viscosity: 147.2 mPas, average particle diameter: 106 nm.

Example 4

Preparation of a Polyurethane and a Polyurethane Dispersion

A 4 l reaction vessel equipped with a stirrer, dropping funnel, thermometer and reflux condenser was charged with 485.76 g of polyester acrylate D, 36.6 g of polyesterol C, 31.09 g of dimethylolpropionic acid, 0.055 g of 4-hydroxy-2,2,6,6-tetramethylpiperidine N-oxide in 156.1 g of acetone and this initial charge was stirred at a bath temperature of 75° C. Over the course of 40 minutes, 302.5 g of component A were added dropwise. After 90 minutes 0.54 g of dibutyltin dilaurate was added dropwise. At an NCO content of 0.72% the batch was diluted with 305.12 g of acetone and neutralized with 83.6 g of 10% strength aqueous sodium hydroxide solution. Over the course of 20 minutes, 1222.13 g of water were introduced dropwise into the polymer solution with stirring. Thereafter the acetone was distilled off under reduced pressure and the batch was diluted with 81.5 g of water.

Solids content: 36%, pH: 7.51, viscosity: 96 mPas, average particle diameter: 153 nm.

Example 5

Preparation of a Polyurethane and a Polyurethane Dispersion

A 4 l reaction vessel equipped with a stirrer, dropping funnel, thermometer and reflux condenser was charged with 364.8 g of polyester acrylate D, 36.6 g of polyesterol C, 9 g of 1,4-butanediol, 26.13 g of dimethylolpropionic acid, 0.046 g of 4-hydroxy-2,2,6,6-tetramethylpiperidine N-oxide in 130.49 g of acetone and this initial charge was stirred at a bath temperature of 75° C. Over the course of 40 minutes, 275 g of component A were added dropwise. When the feed was at an end, 0.46 g of dibutyltin dilaurate was added. At an NCO content of 0.55% the batch was diluted with 266.98 g of acetone and neutralized with 70 g of 10% strength aqueous sodium hydroxide solution. Over the course of 20 minutes, 1015.55 g of water were introduced dropwise into the polymer solution with stirring. Thereafter the acetone was distilled off under reduced pressure and the batch was diluted with 84.5 g of water.

Solids content: 35%, pH: 7.82, viscosity: 299 mPas, average particle diameter: 181 nm.

Example 6

Preparation of a Polyurethane and a Polyurethane Dispersion

A 4 l reaction vessel equipped with a stirrer, dropping funnel, thermometer and reflux condenser was charged with 522.24 g of polyester acrylate D, 19.62 g of polyesterol C, 29.48 g of dimethylolpropionic acid, 0.057 g of 4-hydroxy-2,2,6,6-tetramethylpiperidine N-oxide in 161.11 g of acetone and this initial charge was stirred at a bath temperature of 75° C. Over the course of 40 minutes, 151.25 g of component A and 72.05 g of bis(4,4'-isocyanatocyclohexyl)methane were added dropwise. When the feed was at an end, 0.58 g of dibutyltin dilaurate was metered in. At an NCO content of 0.72% the batch was diluted with 267.05 g of acetone and neutralized with 79.2 g of 10% strength aqueous sodium hydroxide solution. Over the course of 20 minutes, 1133.35 g of water were introduced dropwise into the polymer solution with stirring. Thereafter the acetone was distilled off under reduced pressure and the batch was diluted with 113.3 g of water.

Solids content: 34%, pH: 7.51, viscosity: 36 mPas, average particle diameter: 197 nm.

Example 7

Preparation of a Polyurethane and a Polyurethane Dispersion

A 4 l reaction vessel equipped with a stirrer, dropping funnel, thermometer and reflux condenser was charged with 441.6 g of polyester acrylate D, 36.6 g of polyesterol C, 29.48 g of dimethylolpropionic acid, 0.05 g of 4-hydroxy-2,2,6,6-tetramethylpiperidine N-oxide in 143.19 g of acetone and this initial charge was stirred at a bath temperature of 75° C. Over the course of 40 minutes, 275 g of component A were added dropwise. When the feed was at an end, 0.5 g of dibutyltin dilaurate was added. At an NCO content of 0.80% the batch was diluted with 278.5 g of acetone. Subsequently, at a temperature of 30° C., 2.1 g of 1,2-ethanediamine in solution in 20 g of acetone were metered in and the batch was neutralized with 79.2 g of 10% strength aqueous sodium hydroxide solution. Over the course of 20 minutes, 1118.59 g of water were introduced dropwise into the polymer solution with stirring. Thereafter the acetone was distilled off under reduced pressure and the batch was diluted with 93.2 g of water.

Solids content: 35%, pH: 7.70, viscosity: 324 mPas, average particle diameter: 152 nm.

Example 8

Preparation of a Polyurethane and a Polyurethane Dispersion

A 4 l reaction vessel equipped with a stirrer, dropping funnel, thermometer and reflux condenser was charged with 412.8 g of polyester acrylate D, 36.6 g of polyesterol C, 28.14 g of dimethylolpropionic acid, 0.048 g of 4-hydroxy-2,2,6,6-tetramethylpiperidine N-oxide in 134.69 g of acetone and this initial charge was stirred at a bath temperature of 75° C. Over the course of 40 minutes, 275 g of component A were added dropwise. When the feed was at an end, 0.48 g of dibutyltin dilaurate was added. At an NCO content of 1.06% the batch was diluted with 270.8 g of acetone. Subsequently, at a temperature of 30° C., 3.6 g of 1,2-ethanediamine in solution in 20 g of acetone were metered in and the batch was neutralized with 75.6 g of 10% strength aqueous sodium hydroxide solution. Over the course of 20 minutes, 1078.3 g of water were introduced dropwise into the polymer solution with stirring. Thereafter the acetone was distilled off under reduced pressure and the batch was diluted with 71.9 g of water.

Solids content: 36%, pH: 7.63, viscosity: 307 mPas, average particle diameter: 159 nm.

Comparative Example 1

Preparation of a Polyurethane and a Polyurethane Dispersion

In a 4 l reaction vessel equipped with a stirrer, dropping funnel, thermometer and reflux condenser, 74.7 g of polycaprolactone (Capa 212 from Solvay, molar mass=1000 g/mol, OH number=113 mg KOH/g), 26.35 g of 1,2-ethanediol, 69.66 g of hydroxyethyl acrylate, 26.8 g of dimethylolpropionic acid, 0.088 g of 2,6-di-t-butyl-4-methylphenol and 0.047 g of hydroquinone monomethyl ether were stirred at a bath temperature of 75° C. Over the course of 60 minutes, 231.8 g of allophanate-modified polyisocyanate formed from hexamethylene 1,6-diisocyanate and 2-ethylhexanol (NCO content=17.2%, viscosity approximately 300 mPas) and 131 g of bis(4,4'-isocyanatocyclohexyl)methane were added dropwise. When the feed was at an end, 100 g of acetone were metered in. After 90 minutes 0.29 g of dibutyltin dilaurate was added dropwise. At an NCO content of 1.21% the batch was diluted with 201.97 g of acetone and neutralized with 76 g of 10% strength aqueous sodium hydroxide solution. Over the course of 20 minutes, 784.24 g of water were introduced dropwise into the polymer solution with stirring. Thereafter the acetone was distilled off under reduced pressure and the batch was diluted with 157.89 g of water.

Solids content: 36%, pH: 8.16, viscosity: 36 mPas, average particle diameter: 249 nm.

Comparative Example 2

Preparation of a Polyurethane and a Polyurethane Dispersion

In a 4 l reaction vessel equipped with a stirrer, dropping funnel, thermometer and reflux condenser, 74.7 g of polycaprolactone (Capa 212 from Solvay, molar mass=1000 g/mol, OH number=113 mg KOH/g), 26.35 g of 1,2-ethanediol, 69.66 g of hydroxyethyl acrylate, 26.8 g of dimethylolpropionic acid, 0.072 g of 2,6-di-t-butyl-4-methylphenol and 0.039 g of hydroquinone monomethyl ether were stirred at a bath temperature of 75° C. Over the course of 60 minutes 189.95 g of bis(4,4'-isocyanatocyclohexyl)methane and 98.5 g of tris (hexamethylene-diisocyanato)isocyanurate were added dropwise. When the feed was at an end, 95 g of acetone were metered in. After 90 minutes 0.21 g of dibutyltin dilaurate was added dropwise. At an NCO content of 0.50% the batch was diluted with 130.13 g of acetone and neutralized with 76 g of 10% strength aqueous sodium hydroxide solution. Over the course of 20 minutes, 473.41 g of water were introduced dropwise into the polymer solution with stirring. Thereafter the acetone was distilled off under reduced pressure and the batch was diluted with 96.75 g of water.

Solids content: 36%, pH: 8.04, viscosity: >500 mPas, average particle diameter: 955 nm.

No stable dispersion could be obtained.

Film Tests

The coating materials were mixed with 4% by weight (based on the solids content of the dispersions) of photoinitiator Irgacure 500® (mixture of 50% by weight each of benzophenone and 1-hydroxycyclohexyl phenyl ketone) from Ciba Spezialitätenchemie and these mixtures were applied to the respective substrate with a coat thickness of 150 μm (wet), dried in a drying oven at 60° C. for 20 minutes in order to remove water, and exposed twice under an undoped high-pressure mercury lamp (output 120 W/cm) with a lamp-to-substrate distance of 12 cm and a belt speed of 10 m/min to give fingernail-scratch-resistant coatings.

The Erichsen hardness was determined in accordance with DIN 53156 and is a measure of the flexibility and elasticity. It is reported in millimeters (mm). High values denote high flexibility. The films for determining the Erichsen cupping were applied to sheet metal using a spiral-wound coating bar. The coat thickness after exposure was approximately 50 μm.

The pendulum hardness was determined in accordance with DIN 53157 and is a measure of the hardness of the coating. It is reported in seconds until the pendulum stands still. High values in this test denote high hardness. The films for determining the pendulum hardness were applied to glass using a box-type coating bar. The coat thickness after exposure was approximately 50 μm.

| Example | Acrylate content [mol/kg] | Pendulum damping after UV curing after 1 h (s) | Erichsen hardness (mm) |
|---|---|---|---|
| 1 | 1.4 | 119 | 7.4 |
| 2 | 1.9 | 149 | 4.3 |
| 3 | 2.0 | 166 | 6.6 |
| 4 | 2.4 | 136 | 6.7 |
| 5 | 2.3 | 106 | 7.0 |
| 6 | 2.4 | 168 | 5.5 |
| 7 | 2.4 | 174 | 5.3 |
| 8 | 2.4 | 171 | 6.9 |
| C1 | 1.2 | 70 | 9.1 |
| C2 | 1.1 | —* | —* |

*Film testing was not possible since the dispersion is not suitable for producing films

The invention claimed is:

1. A radiation-curable aqueous polyurethane dispersion synthesized from
   a) at least one compound having at least two free isocyanate groups, at least one allophanate group, and at least one free-radically polymerizable C=C double bond attached via the allophanate group, which is attached directly to the double bond a carbonyl group or an oxygen atom in ether function,
   b) at least one compound having at least one group that is reactive toward isocyanate groups, and at least one free-radically polymerizable C=C double bond,
   c1) optionally, at least one compound with a molecular weight of not more than 500 g/mol
   c2) at least one compound which has a molecular weight of more than 500 g/mol having at least two groups that are reactive toward isocyanate groups, selected from hydroxyl, mercapto, and primary and/or secondary amino groups,
   c) at least one compound having at least one group that is reactive toward isocyanate groups, and at least one acid group,
   d) at least one basic compound for at least partial neutralization of the acid groups of compounds c),
   e) optionally, at least one compound different from b), c), and d), containing only one group that is reactive toward isocyanate groups,
   f) optionally, at least one polyisocyanate different from a),
   g) in the absence of a thermal initiator,
   h) optionally, further additives, selected from reactive diluents, photoinitiators, and customary coatings additives,
   k) water, and
   l) optionally, at least one diamine and/or polyamine;
   wherein component c) is present in an amount providing from 16.1 mol% to 45.1 mol% of the at least one group reactive with isocyanate relative to total mols of isocyanate present.

2. The polyurethane dispersion according to claim 1, wherein component c2) is a polyesterol based on aliphatic, cycloaliphatic and/or aromatic dicarboxylic, tricarboxylic and/or polycarboxylic acids with diols, triols and/or polyols.

3. The polyurethane dispersion according to claim 1, wherein component c2) is a lactone-based polyesterol.

4. The polyurethane dispersion according to claim 1, wherein the reaction product of synthesis components a), b), c1), c2), c) and, if appropriate, e) and f) has a double bond density of at least 1.4 mol/kg.

5. The polyurethane dispersion according to claim 1, wherein component a) comprises at least one synthesis component selected from the group consisting of hexamethylene 1,6-diisocyanate, 1,3-bis(isocyanatomethyl)cyclohexane, isophorone diisocyanate, tetramethylxylylene diisocyanate and di(isocyanatocyclohexyl)methane.

6. The polyurethane dispersion according to claim 1, wherein component a) comprises at least one synthesis component selected from the group consisting of 2-hydroxyethyl (meth)acrylate, hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth)acrylate, and pentaerythrityl di- and tri(meth)acrylate.

7. The polyurethane dispersion according to claim 1, wherein component c) is selected from the group consisting of dimethylolpropionic acid and dimethylolbutyric acid.

8. A substrate coated with a polyurethane dispersion according to claim 1.

9. A method of coating a substrate, which comprises applying a polyurethane dispersion according to claim 1 to a substrate, followed by drying and radiation curing.

* * * * *